United States Patent [19]

Lang

[11] Patent Number: 5,508,737
[45] Date of Patent: Apr. 16, 1996

[54] REMOTE VIDEO VIEWING AND RECORDING SYSTEM FOR REMOTELY OCCURRING EVENTS

[75] Inventor: Michael Lang, Ridgewood, N.J.

[73] Assignees: Sony Corporation, Tokyo, Japan; Sony Electronics, Inc., Park Ridge, N.J.

[21] Appl. No.: 267,891

[22] Filed: Jul. 6, 1994

[51] Int. Cl.[6] .................................................. H04N 7/18
[52] U.S. Cl. .......................... 348/159; 348/8; 348/157; 348/705
[58] Field of Search .................... 348/157, 159, 348/705, 8, 10; H04N 7/18

[56] References Cited

U.S. PATENT DOCUMENTS

| | | |
|---|---|---|
| 3,217,098 | 11/1965 | Oswald ................................ 348/157 |
| 3,984,625 | 10/1976 | Camras . |
| 4,097,893 | 6/1978 | Camras . |
| 4,227,259 | 10/1980 | Mogi . |
| 4,394,691 | 7/1983 | Amano et al. . |
| 4,519,002 | 5/1985 | Amano . |
| 4,527,204 | 7/1985 | Kozakai et al. . |
| 4,598,287 | 7/1986 | Osakabe et al. . |
| 4,620,229 | 8/1986 | Amano et al. . |
| 4,746,983 | 5/1988 | Hakamada . |
| 4,751,581 | 6/1988 | Ishiguro et al. . |
| 4,807,052 | 2/1989 | Amano . |
| 4,817,203 | 3/1989 | Tsurumoto et al. . |
| 4,821,102 | 4/1989 | Ichikawa et al. . |
| 4,862,269 | 8/1989 | Sonoda et al. . |
| 4,916,530 | 4/1990 | Neilson et al. . |
| 4,916,532 | 4/1990 | Streck et al. . |
| 4,992,866 | 2/1991 | Morgan ................................ 348/705 |
| 5,062,010 | 10/1991 | Saito . |
| 5,073,823 | 12/1991 | Yamada et al. . |
| 5,193,208 | 3/1993 | Yokota et al. . |
| 5,210,603 | 5/1993 | Sabin ................................... 348/157 |
| 5,264,929 | 11/1993 | Yamaguchi ......................... 348/159 |
| 5,264,935 | 11/1993 | Nakajima . |
| 5,325,202 | 6/1994 | Washino ............................. 348/705 |

*Primary Examiner*—Howard W. Britton
*Attorney, Agent, or Firm*—Ronald P. Kananen

[57] ABSTRACT

A video recording system comprises a method and apparatus provided for video recording remotely-generated images at a central, predetermined location. The system includes a plurality of video cameras fixedly or variably positioned at a plurality of fixed or variable locations remote from a conveniently-located viewstation having a plurality of television monitors and associated video camera jacks. The images gathered by the video cameras are continuously or intermittently displayed at one or more of the television monitors, so that a user having a video camera can connect the video camera to a video camera jack and independently record the image selected. For example, when the plurality of video cameras are positioned along a roller coaster path, the video camera can record a plurality of sequences of the roller coaster at spaced locations along the path.

9 Claims, 5 Drawing Sheets

REMOTE VIDEO VIEWING AND RECORDING SYSTEM FOR REMOTELY OCCURRING EVENTS

BACKGROUND OF THE INVENTION

The present invention is directed to a video system for remotely viewing and recording predetermined views of an event, and of participants in the event, in a predetermined sequence. More particularly, the video recording and reproducing system according to the invention is directed to a system which permits visitors to, or observers at, an amusement park, sporting event, carnival, or the like, to record predetermined views of the event, and participants in the event, from a remote location, in a predetermined sequence as produced by a plurality of video cameras positioned at predetermined locations at the event. Still more particularly, this invention relates to a system for remotely viewing and video recording an event and person of interest at a location remote from either the event or the person.

BRIEF DESCRIPTION OF RELEVANT ART

When visiting public locations or public events, such as carnivals, amusement parks, sporting events or the like, it is often desirable to record the occasion through use of photographic or video recording media. Thus, it is common for visitors to such public locations and events to bring photographic or video recording equipment with them for the purpose of recording specific activities during the occasion of such a visit. In the usual practice, the visitor selects a desired vantage point at the event and takes those pictures or makes such video recordings as are of interest to the visitor.

However, it is often difficult, or even impossible, to capture views of a popular event because of the press of many visitors seeking commonly desirable locations which might be regarded as particularly worthy of serving as a recording site. Thus, stability of viewing during the picture taking or video recording activity may be interrupted, especially during exciting times at the event. In addition, desirable views may occur at locations far away from the photographic or video recording equipment, or from the operator of such equipment, so that meaningful, desirable, or closeup views cannot be captured at a precise time of interest to the visitor. Further, many activities may take place within confines which may not be generally accessible or otherwise viewable by the operator of the photographic or video equipment, or in which such recording is prohibited because of proscriptions against recording without license from a performer or relating to the performance.

For example, in the case of an amusement ride, such as a roller coaster, extraneous items such as cameras and video recorders may not be permitted on the ride for various reasons, such as safety. An operator of the photographic or video equipment may not actually be a participant in the event but rather only an observer, and therefore might be positioned at a general observation location from which it is not possible to obtain optimum and interesting views of participants or riders. Thus, video or photographic recordings made by observers or participants in these events may not include views or scenes of the more highly desirable features of the event and event participants. As a specific example, a parent of a younger child might wish to record the child's ride on a circus animal, such as an elephant, for example; however, the remoteness of ground level locations away from the path of the elephant's ride precludes closeup shots of the child's enthusiastic reactions.

A fixed photographic system is apparently known to the art. It is understood that the Anaconda roller coaster of the Kings Dominion amusement park near Richmond, Va. utilizes fixed cameras and makes available for purchase fixed location photographs of cusomers for direct purchase at the end of a roller coaster ride.

Aside from the above difficulties in the process of having video or photographic equipment at an event such as an amusement park, sporting event, or the like, at least some time and effort is required to ensure that the photographic or video equipment is safe and secure during the public event. Thus, it would be desirable to make video recordings at a convenience and secure location for the convenience of the observer.

In a different aspect, activities of performers or portions of performances are often not available except through a purchase or rental of licensed video recordings. But, such recordings lack the spontaneity and realism of the event which the viewer attended personally. Thus, it is also sometimes desirable to have a way to permit portions of public performances, which were heretofore restricted, available for recording on a "live" basis, whether in whole or in part, according to appropriate licensing fees for the performer or performance.

These and other difficulties are apparent when considering problems faced by a viewer in obtaining satisfactory recordings under the circumstances at public events or locations as described.

SUMMARY OF THE INVENTION

Therefore, it is an overall object of this invention to provide a video recording system having video cameras remotely located along the venue of an event for providing video images at a viewing station where a user can record those images with the user's own television equipment, such as a personal video camera.

It is another object of this invention to provide a video recording system having video cameras remotely located from a central viewstation and controlled to provide selected images at the viewstation for recording by others, such as by a personal video camera.

Directed to achieving the foregoing objects and aims of the invention, a video recording system comprises a method and apparatus provided for video recording remotely-generated images at a central, predetermined location. The system includes a plurality of video cameras fixedly or variably positioned at a plurality of fixed or variable locations remote from a conveniently-located viewstation having a plurality of television monitors and associated video camera jacks. The images gathered by the video cameras are continuously or intermittently displayed at one or more of the television monitors, so that a user having a video camera can connect the video camera to a video camera jack and independently record the image selected. For example, when the plurality of video cameras are positioned along a roller coaster path, the video camera can record a plurality of sequences of the roller coaster at spaced locations along the path.

In another aspect, the system according to the invention includes video cameras which are programmed to scan a variable location or to zoom for a closeup. For the example of the roller coaster noted above, the video cameras can programmably follow a roller coaster through a portion of its path, or zoom to observe a closeup of persons secured in the roller coasters.

DESCRIPTION OF THE INVENTION

The following description is presented in the context of an event such as an amusement park ride; however, it will be recognized that the present invention could be equally well utilized at other events such as carnivals, sporting events, or the like.

Figure 1:
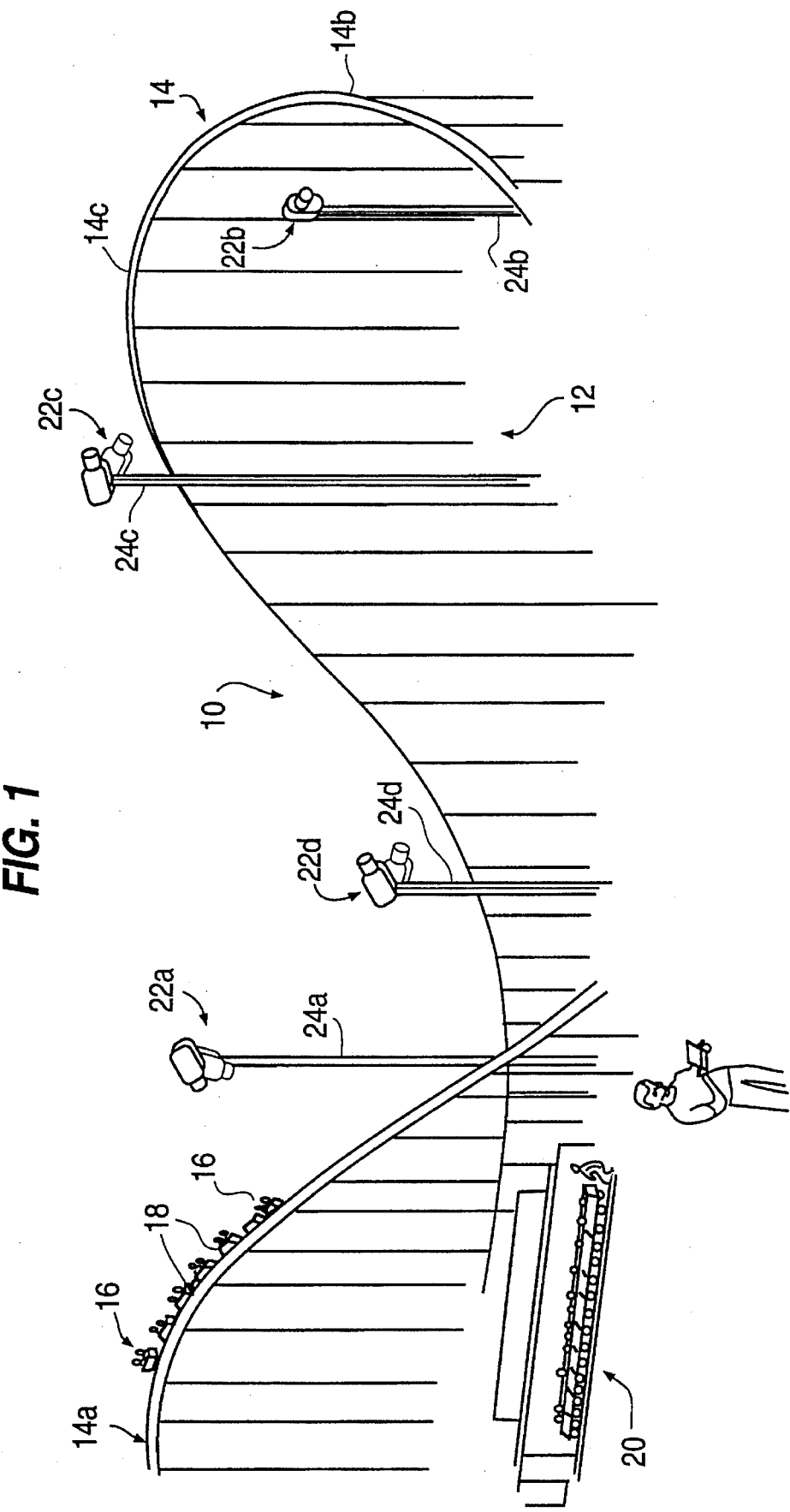
FIG. 1 is a representative sketch of a portion of a roller coaster ride at an amusement park, having a plurality of fixed video camera locations at which the video cameras are fixed or have variable viewing features, according to the invention.

In FIG. 1, an amusement ride such as a roller coaster is shown generally by a reference numeral 10. As is well known, the roller coaster 10 includes a physical structure shown generally at a reference numeral 12 for supporting a roller coaster rail (i.e., a monorail, birail, or the like) 14 arranged in a serpentine, undulating pattern of rises, falls, and curves to provide thrilling sensations to riders, shown generally at a reference numeral 16 in a plurality of connected roller coaster cars 18. An access area to the ride where customers can await their turn to ride the roller coaster is shown generally at the reference numeral 20.

In accordance with the invention, a plurality of video cameras 22, four of which are representatively shown by the reference numerals 22a, 22b, 22c, and 22d, are fixedly mounted on corresponding mounting structures 24a to 24d at spaced, selected locations along the path of the cars 18 of the roller coaster 10. The focus of each of the cameras 22 may be fixed or adjustable, and the positioning of each of the cameras 22a to 22d may be fixed or adjustable, as shown in the phantom outline for each of the cameras 22. Thus, a camera 22a, for example, may be fixed to view riders 16 in cars 18 at a top level of the track 14 where customers are expectantly awaiting the thrill of the forthcoming descent along the rail 14a. Alternatively, the camera 22a can be programmed to zoom in on the faces of the riders 16, and/or programmed to pivot (i.e. to pan or tilt) to maintain the riders 16 in focus for a prolonged period of time compared to a fixed camera position. If desired, at least one video camera could be placed on the lead roller coaster car 18, for example, and its output provided by wireless link to a monitoring location in a manner similar to cameras mounted on racing cars.

Similarly, the video camera 22b is positioned to view the riders at an ascending portion of the roller coaster at a path position along the rail 14b spaced from the camera 22a. Representatively, the video camera 22c is positioned at the top of the roller coaster path, spaced at a path position along the rail 14c spaced from the camera 22b. In addition, the camera 22d is fixed downstream from the camera 22c to view the descent along the rail 14d. A greater number of cameras can also be used.

The cameras 22a to 22d can be arranged to produce continuous signals for individual monitoring, or programmed to operate in conjunction with the passage of the roller coaster cars, thus to provide a progressive sequence of video images for recording. Such programming can be responsive to the time at which the cars will pass the fixed camera locations according to the experience with the particular roller coaster at which the cameras are used. Alternatively, a wireless interface between the cars of the roller coaster and the video cameras could also be used to activate the cameras in a sequential manner. Such wireless links are known to the art as are representively shown by the U.S. Pat. Nos. 3,984,625; 4,097,893; and 4,916,530, which are incorporated by reference. microprocessor controlled system could be used to pan, tilt and zoom the respective cameras 22a to 22d to follow the action of the cars and to shift the resulting video display from one camera view to the next as the ride on the roller coaster progresses.

The position of the cars 18 of the roller coaster could also be sensed in a number of ways. For example, sensors located at track level could be used to sense the position of the cars 18 and could thus provide an input to a selected camera for recording, or to a microprocessor as a sensor input to control the recording process. Alternatively, the cars 18 could be equipped with wireless transmitters for beaming a signal to an interceptor for controlling the operation of a selected camera, or for providing an input to a microprocessor as a sensor input to control the recording process. Other types of sensors could be used as well.

Figure 2:
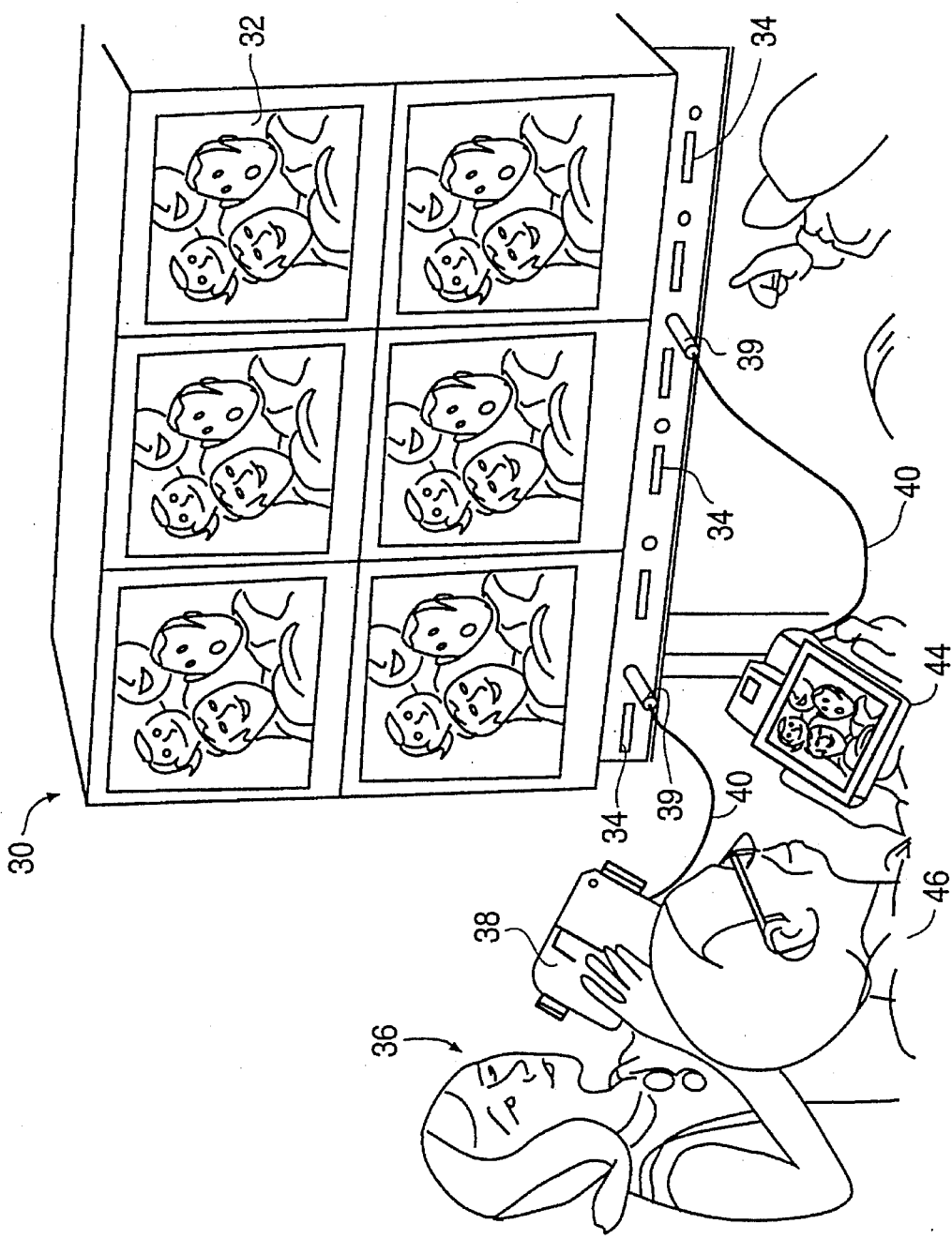
FIG. 2 is a representative perspective view of a plurality of video monitors at a central viewstation showing closeups of riders in one of the roller coaster cars of FIG. 1, and further illustrating persons who are video recording the images of those closeups on the video monitors.

FIG. 2 shows a viewstation 30 having a plurality of video monitors designated generally by the reference numeral 32, each showing the selected sequential output of the video cameras 22a to 22d. It is a feature of the invention that a plurality of video jacks 34 are provided so that a user 36 can connect a personal video camera 38 to the jack 34 by a connector 39 on a cable 40 and record the output of the video camera system of FIG. 1 on the personal video camera 38. The security of the recording step could be implemented to require a payment by the user for the service, or as payment of a license fee, where a licensable performance is involved. Specially constructed jacks 34 could also be used with restricted connectors 40 to ensure that only authorized persons are able to avail themselves of this service as described.

In addition to providing a recorded video image for recording on a personal video camera, the video image can be provided to a Watchman brand or Video Walkman-type of product in a "local area narrowcast" application. Such a video image could then supplement current events being viewed on the video, such as on a "picture in a picture" basis.

Figure 3:
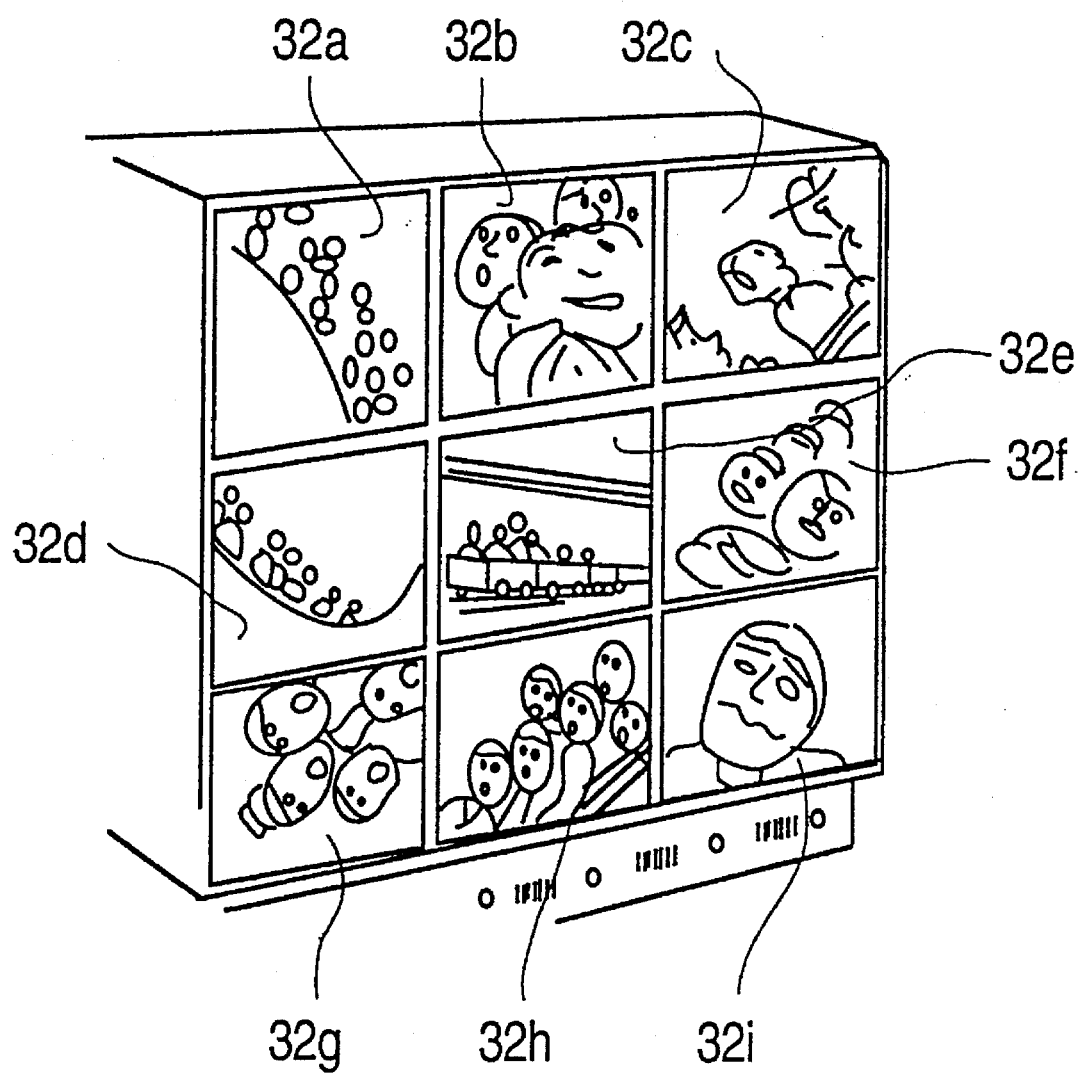
FIG. 3 is a representative diagram of a plurality of images generated by the plurality of cameras located along the path of the roller coaster of FIG. 1.

FIG. 3 shows an alternative view of the video monitors 32a to 32i wherein a different image is displayed on each of the monitors respectively. Such an output arrangement is shown diagrammatically in FIG. 4 wherein a plurality of video monitors 32a to 32n are respectively connected to a like plurality of video cameras 22a to 22n. A controller 45 is provided with suitable conduits 47 to respectively control the pan, tilt and zoom motions of the respective video cameras 22a to 22d in a manner which is well known in the art using servo motors and suitable servo control techniques.

The line breaks generally shown at reference numeral 46 illustrate that signals from the respective cameras in the system may be hardwired or transmitted.

The image displayed at the video monitors 32a to 32n could also be selected manually by an operator. As shown, however, the user can select which view he wishes to follow and record that particular view, such as upon notice from an operator.

Figure 4:
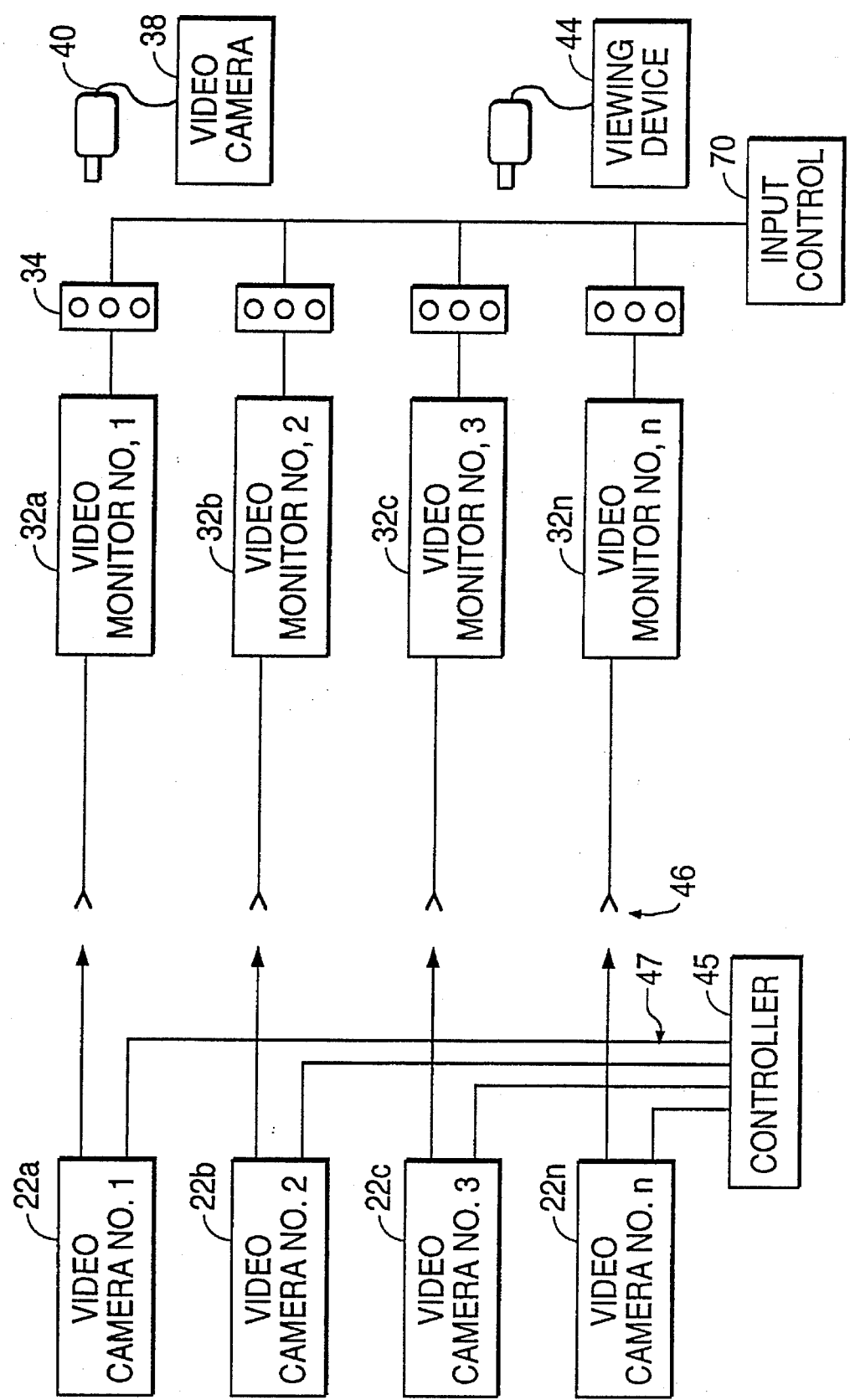
FIG. 4 is a simplified diagram of a plurality of video cameras providing a plurality of video images at centrally-located video monitors for selective recording by users.
Figure 5:
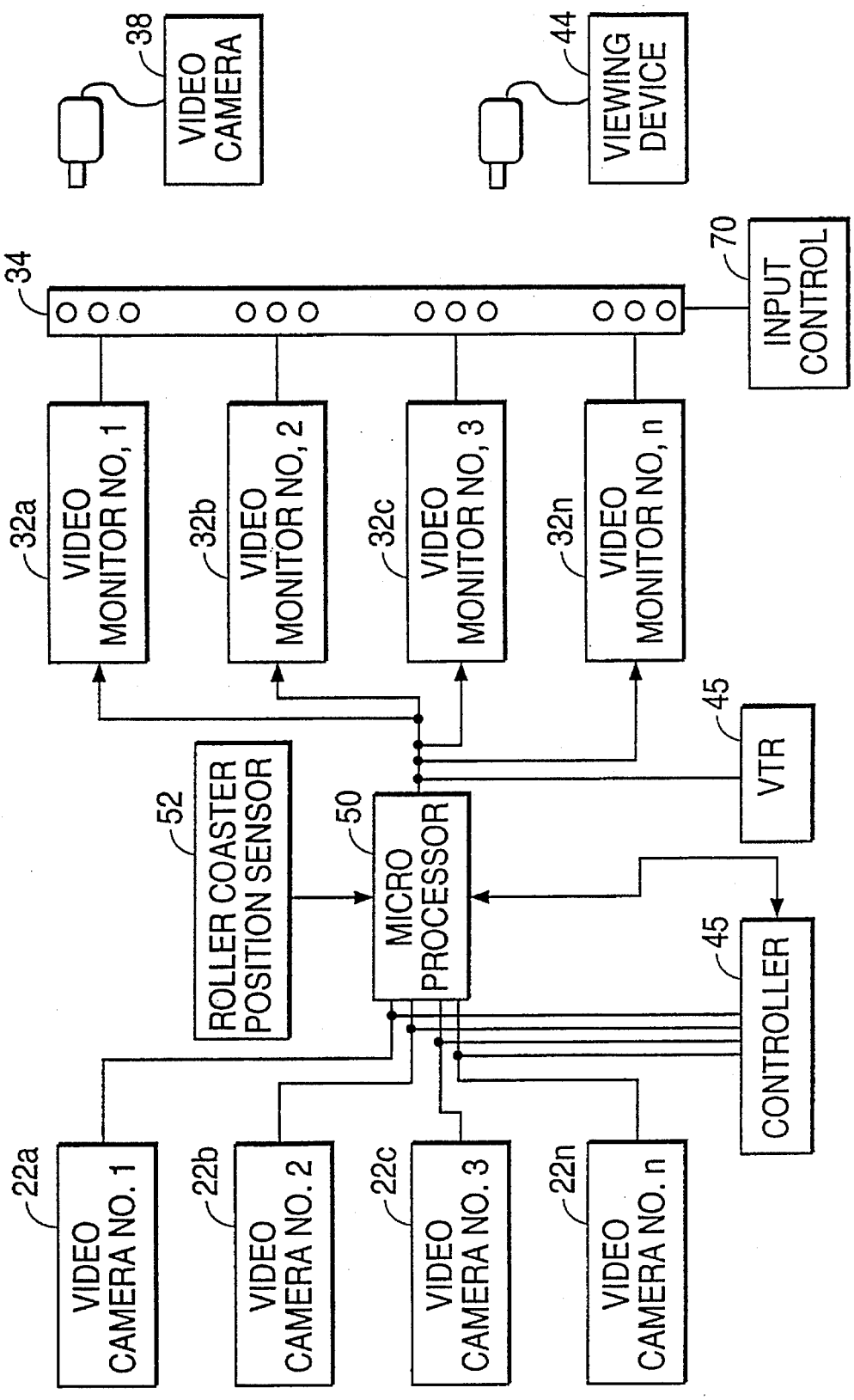
FIG. 5 shows a block diagram of microprocessor controlled system for producing a controlled sequence of images at centrally-located video monitors and a video recording of such images.

FIG. 5 shows a representative system for displaying a single selected monitored video image on a plurality of video monitors for recording by a number of users. The controller 45, as in FIG. 4, controls the pan, tilt and zoom features of the video cameras 22, but in cooperation with a microprocessor 50 which controls the video sequencing and recording operations of each of the respective video cameras as a function of time or position of the roller coaster 10 to display the selected video image on the video monitors 32a to 32n to be viewed or recorded by individuals as discussed in connection with FIG. 2. The microprocessor 50 could be connected to a roller coaster sensor 52 to initiate certain recording events, as described above.

An input control device 70, shown in FIGS. 4 and 5, controls recording to authorized persons, such as those having amusement park tickets for such, or for a fee. Thus, the input control device could be a simple coin operated switch, a magnetic card reader, or a keypad for inhibiting or prohibiting use of the jacks for recording or viewing the video images at the central location based on images generated from a remote location.

It is a feature of the invention that individual video tapes of a particular ride could also be made available to a customer in the event that a customer chooses to ride along in one of the cars of the roller coaster. In that case, a personal video tape could be provided as made at the central viewstation by a video tape recorder (VTR) 56. In that case, a user could purchase a tape showing the event, while also having an opportunity to participate in the event.

An advantage of the invention is that it can be implemented using existing technology and available equipment in a way which presents few construction difficulties.

In view of the above, it is apparent that in accordance with the present invention, an apparatus that fully satisfies the objectives, aims and advantages thereof is described. It would be appreciated that while the invention has been described in the context of specific embodiments, many alternatives, modifications, permutations and variations thereon will become apparent to those skilled in the art in light of the foregoing descriptions.

Accordingly, it is intended that the present invention embrace all such alternatives, modifications and variations as falling within the scope of the appended claims.

What it claimed is:

1. An event viewing and recording system for selectively providing images from desired vantage points to consumer users, comprising:

a plurality of video cameras positioned at predetermined locations at a predefined event occurrence area for capturing video images of activities occurring within a predetermined view of said event occurrence area;

a plurality of video display monitors positioned at a central observation viewstation for viewing images provided by said plurality of video cameras;

a plurality of video output terminals positioned at said central observation viewstation for interfacing with video recording apparatus;

means for selectively routing video signals from said plurality of video cameras to said plurality of video display monitors and said plurality of video output terminals; and control input means for preventing recording by non-authorized viewers;

whereby an authorized user can selectively record said video signals available at one of said plurality of video output terminals at said viewstation.

2. An even viewing and recording system according to claim 1, wherein said control input means comprises a coin actuated switch.

3. An event viewing and recording system according to claim 1 wherein said control input means comprises a magnetic card reader.

4. An event viewing and recording system according to claim 1 wherein said control input means comprises a keypad.

5. The system as set forth in claim 1, wherein said control input means comprises specially constructed jacks having restricted connectors which restrict access to said plurality of video output terminals.

6. The system as set forth in claim 1, further including:

control means for controlling said selectively routing means so as to route video signals to said display monitors and said video output terminals in a predetermined sequence according to a predetermined control signal.

7. An event recording and viewing system according to claim 6 wherein said control means comprises a microcomputer.

8. An event viewing and recording system comprising:

a plurality of video cameras positioned at desired locations at a predefined event occurrence area for capturing video images of activities occurring within a predetermined view of said event occurrence area;

a plurality of video display monitors positioned at a central observation viewstation for viewing images captured by said plurality of video cameras;

a plurality of video output terminals positioned at said central observation viewstation for interfacing with video recording apparatus;

switching means for selectively routing video signals from said plurality of video cameras to said plurality of video display monitors and said plurality of video output terminals; control input means for generating a control signal upon an authorized user actuation to initiate recording of said video signals;

a plurality of activity sensing means for detecting activity within said event occurrence area; and controller means for controlling said switching means so as to route video signals to said display monitors and said video output terminals in a predetermined sequence according to said predetermined control signal and said plurality of activity sensing means.

9. The system as set forth in claim 8, wherein said event occurrence area is an area of an amusement park.

* * * * *